(No Model.)

C. F. BROWN.
BUTCHER'S DERRICK.

No. 539,341. Patented May 14, 1895.

WITNESSES:
Chas. Nida
N. B. Hutchinson

INVENTOR
C. F. Brown
BY
Munn & Co.
ATTORNEYS.

United States Patent Office.

CHARLES FILLMORE BROWN, OF SHREVEPORT, LOUISIANA.

BUTCHER'S DERRICK.

SPECIFICATION forming part of Letters Patent No. 539,341, dated May 14, 1895.

Application filed September 12, 1894. Serial No. 522,771. (No model.)

*To all whom it may concern:*

Be it known that I, CHARLES FILLMORE BROWN, of Shreveport, in the parish of Caddo and State of Louisiana, have invented a new and Improved Butcher's Derrick, of which the following is a full, clear, and exact description.

My invention relates to improvements in butcher's derricks; and the object of my invention is to produce an extremely cheap, strong and simple apparatus, which is in the form of a tripod which may be easily spread out so as to enable a carcass to be conveniently fastened to it, which may be erected by a windlass which it carries, which when erected lifts the carcass at the same time, and which is adapted to connect with the hide of the animal which it carries and may be worked by the windlass so as to quickly and nicely strip the hide from the carcass.

To these ends my invention consists of a butchers' derrick, the construction of which will be hereinafter described and claimed.

Reference is to be had to the accompanying drawings, forming a part of this specification, in which similar figures of reference indicate corresponding parts in both the views.

Figure 1:
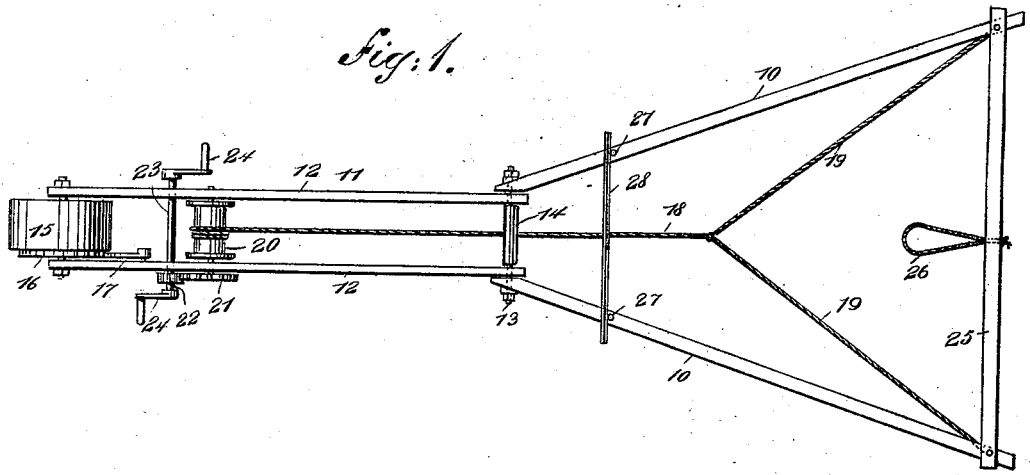
Figure 2:
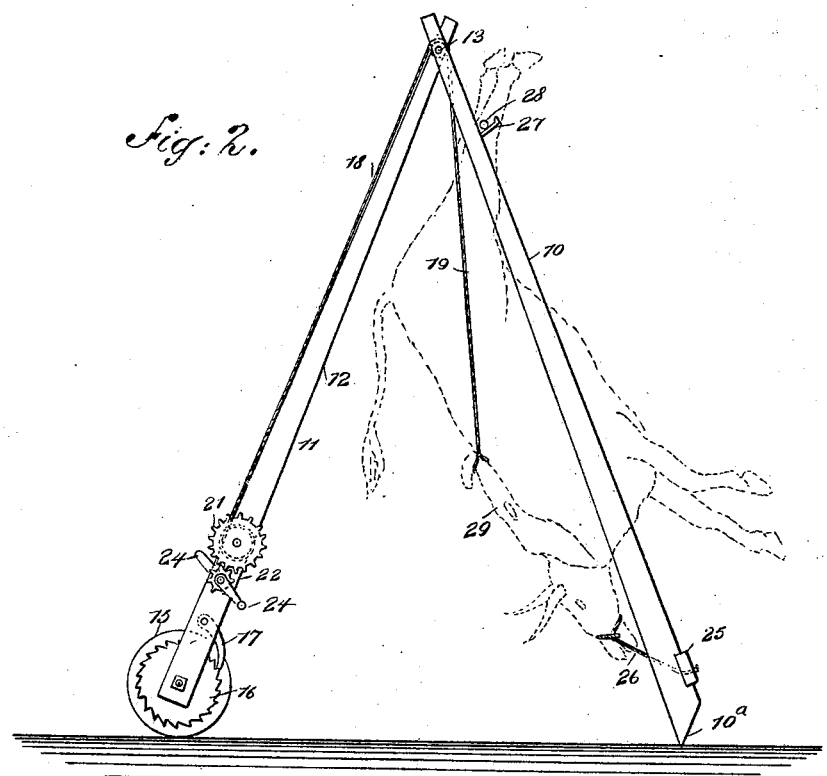

Figure 1 is a plan view of the derrick as spread out ready to receive its load; and Fig. 2 is a side elevation of the derrick in its raised position, showing in dotted lines thereof a carcass to the skin of which the hoisting-rope or cable is secured.

The derrick is in the form of a tripod having two similar spreading legs 10 and a double leg 11 formed of parallel timbers 12, the three legs being pivoted at the top by a rod 13 on which is a broad pulley 14 adapted to guide the hoisting and stripping cable or rope, as hereinafter described. The legs 10 are preferably pointed at the bottom, as shown at 10ᵃ in Fig. 2, so that they will stand firmly on a floor or the ground, and the leg 11 is journaled on a roller 15, which is held between the two members 12 of the leg, and this roller is adapted to roll back and forth in relation to the legs 10, so as to enable the derrick to be easily spread out or erected; and to prevent the roller from turning in the wrong direction and permit the derrick to accidentally spread when it is carrying a load. The roller is provided with a ratchet wheel 16 which engages a pawl 17 pivoted on one member 12 of the leg 11, this pawl being thrown out of engagement with the ratchet wheel when the derrick is to be spread.

The derrick is provided with a hoisting rope or cable 18, which is also used in stripping the skin from an animal, as hereinafter described, and at one end this cable terminates in branches 19, which are adapted to be secured to the feet of the legs 10, and at the other end the cable is fastened to the drum 20 of a windlass, which drum is journaled between the members 12 of the leg 11 and is driven by a gear wheel 21, this meshing with a pinion 22 on the crank shaft 23 which is also journaled in the members 12 and has, at its opposite ends, crank handles 24 by which it may be turned, two handles being provided so that the machine may be worked from either side of the leg 11.

The spreading legs 10 are, near their lower ends, connected by a cross brace 25 to which is fastened a loop 26 adapted to be secured to the nose of an animal to be raised and skinned, and the legs 10 have, near their upper ends, pins 27 adapted to support a gambrel 28 which is secured in the ordinary way in the legs of the animal to be raised.

In using the derrick it is first spread out, as in Fig. 1. The animal to be raised and skinned has the hide started from its nose and head, as shown at 29. The skin is slipped down the legs and belly. The gambrel 28 is placed in the hind legs of the animal and on the pins 27, and then by turning the windlass the cable 18 is wound up, thus moving the roller 15 toward the feet of the legs 10 and raising the middle portion of the derrick, together with the carcass. The ends 19 of the cable 18 are then detached from the derrick, the cable is thrown over the pulley 14, and the ends tied to the loosened portion 29 of the hide, which portion has been started from the nose of the animal and, by winding the cable on the windlass, the hide is stripped neatly and quickly from the carcass and as the carcass is suspended, as specified, it enables the blood to drain completely from the carcass and so render the meat more marketable than it would otherwise be.

From the above description it will be understood that the apparatus is adapted for either indoor or outdoor use, and that the entrails of the animal may be removed while the hide is being taken off, thus shortening the slaughtering process.

Having thus described my invention, I claim as new and desire to secure by Letters Patent—

1. A butcher's derrick, comprising a tripod, the legs of which are pivoted together at the top, a roller journaled at the foot of one leg, and a cable and windlass for raising the tripod, subtantially as described.

2. A butcher's derrick, comprising a tripod having two spreading legs, and a third leg formed of parallel members, the three legs being pivoted together at the top, a roller journaled between the members of the third leg, a ratchet wheel and pawl for the roller, a windlass on the third leg, and a cable connecting the windlass with the spreading legs, substantially as described.

3. A butcher's derrick, comprising a pair of spreading legs connected by a brace, a third leg formed of parallel members, the three legs being pivoted together at the top, a guide pulley at the top of the legs, a roller journaled between the members of the third leg, means for preventing back rotation of the roller a windlass on the third leg, and a cable secured to the windlass, substantially as described.

4. A butcher's derrick, comprising three legs pivoted at their upper ends, to form a tripod, one of said legs having a roller mounted at its foot and adapted to roll upon the ground, a windlass mounted on one leg, and a rope connected at one end to the windlass and adapted to be wound thereon, the other end of said rope being adapted to be connected to the other legs, substantially as set forth.

CHAS. FILLMORE BROWN.

Witnesses:
   C. W. KELLY,
   J. E. GOODWIN.